United States Patent
Sugarmen et al.

(10) Patent No.: US 6,973,789 B2
(45) Date of Patent: Dec. 13, 2005

(54) METHOD OF AND APPARATUS FOR PRODUCING POWER IN REMOTE LOCATIONS

(75) Inventors: Chaim Sugarmen, mevaseret Zion (IL); Uriyel Fisher, Haifa (IL); Ariel Rotstein, Moshav Aderet (IL)

(73) Assignee: Ormat Technologies, Inc., Sparks, NV (US)

( * ) Notice: Subject to any disclaimer, the term of this patent is extended or adjusted under 35 U.S.C. 154(b) by 0 days.

(21) Appl. No.: 10/460,369

(22) Filed: Jun. 13, 2003

(65) Prior Publication Data

US 2004/0055303 A1 Mar. 25, 2004

Related U.S. Application Data

(63) Continuation-in-part of application No. 10/376,620, filed on Mar. 3, 2003, which is a continuation-in-part of application No. 09/188,185, filed on Nov. 10, 1998, now Pat. No. 6,526,754.

(51) Int. Cl.$^7$ .............................................. F01K 1/00
(52) U.S. Cl. ........................................ 60/670; 60/39.182
(58) Field of Search ............................ 60/670, 39.182

(56) References Cited

U.S. PATENT DOCUMENTS

| | | | | |
|---|---|---|---|---|
| 4,414,813 A | * | 11/1983 | Knapp | 60/655 |
| 5,341,637 A | * | 8/1994 | Hamrick | 60/39.464 |
| 5,666,890 A | * | 9/1997 | Craig | 110/229 |
| 6,385,296 B1 | * | 5/2002 | Hardy et al. | 379/1.01 |
| 6,477,841 B1 | * | 11/2002 | Yantovsky | 60/641.8 |
| 6,526,754 B1 | * | 3/2003 | Bronicki | 60/671 |

* cited by examiner

*Primary Examiner*—Hoang Nguyen
(74) *Attorney, Agent, or Firm*—Nath & Associates PLLC; Gary M. Nath; Jerald L. Meyer

(57) ABSTRACT

A system for producing power at remote locations comprises: a closed cycle vapor turbine unit having an evaporator containing liquid working fluid, a turbine receiving vapor of the evaporated working fluid for producing power by way of an electrical generator coupled to the turbine, a condenser and means for returning the working fluid condensate from the condenser to the evaporator; a biomass furnace associated with the evaporator for heating working fluid present in the evaporator and evaporating a portion of the working fluid; and a controller for controlling the amount of biomass fuel supplied to the biomass furnace in accordance with energy requirements of a customer load. Further, a method for producing power using the system is also provided.

17 Claims, 4 Drawing Sheets

METHOD OF AND APPARATUS FOR PRODUCING POWER IN REMOTE LOCATIONS

This application is a Continuation-in-part Patent application of U.S. patent application Ser. No. 10/376,620 filed Mar. 3, 2003 which is a Continuation-in-part Patent application of U.S. patent application Ser. No. 09/188,185 filed Nov. 10, 1998 now U.S. Pat. No. 6,526,754, the entire contents of which are hereby incorporated by reference in their entirety.

BACKGROUND OF THE INVENTION

1. Field of the Invention

The present invention relates to a method of and apparatus for the operation of a closed cycle vapor turbine unit by biomass only, or combined with photovoltaic solar energy, and more particularly, a method of and apparatus for the operation of a closed cycle vapor turbine based on an organic Rankine cycle with biomass only or combined with photovoltaic solar energy.

2. Description of the Prior Art

Many communities in remote locations are living on agriculture products. Such products in most cases are partially processed in the fields or near the farmer's home or in the village. There are large quantities of unused biomass wastes that remain to rot or decompose on site.

At the same time, many of such rural communities are not connected to the electric grid, but they need electrification to improve the quality of life.

The present invention overcomes the above deficiencies by the use of biomass in remote agricultural locations that fuel small closed cycle vapor turbine (CCVT) units. Because of the seasonal production of the various crops, such a unit can be easily controlled to use all available crops such as coffee husks, maize, wheat, wood chips, etc.

Since many of the locations that require remote electrification are in the region of intense solar radiation, and in case the user may not always have enough biomass supply for continuous operation, solar photovoltaic (PV) cells can be combined with the biomass system to supply electric energy during the day time or during periods of low biomass supply.

BRIEF SUMMARY OF THE INVENTION

The present inventive subject matter is drawn to a system for producing power at remote locations comprising: a closed cycle vapor turbine unit having an evaporator containing liquid working fluid, a turbine receiving vapor of the evaporated working fluid for producing power by way of an electrical generator coupled to the turbine, a condenser and means for returning the working fluid condensate from the condenser to the evaporator; a biomass furnace associated with the evaporator for heating working fluid present in the evaporator and evaporating a portion of the working fluid; and a controller for controlling the amount of biomass fuel supplied to the biomass furnace in accordance with energy requirements of a customer load.

Preferably, the controller for controlling the amount of fuel supplied to the biomass furnace further controls the amount of biomass fuel supplied to the biomass furnace also in accordance with a control signal from a buffer load connected to the output of the generator. Also preferably, the controller for controlling the amount of biomass fuel supplied to the biomass furnace additionally controls the amount of biomass fuel supplied to the biomass furnace also in accordance with a monitored evaporator temperature.

The present inventive subject matter is further drawn to a method for producing power in remote locations comprising the steps of: providing a closed cycle vapor turbine unit having an evaporator containing liquid working fluid, a turbine receiving vapor of the evaporated working fluid for producing power by way of an electrical generator coupled to the turbine, a condenser and means for returning the working fluid condensate from the condenser to the evaporator; heating the working fluid present in the evaporator and evaporating portion of the working fluid using a biomass furnace associated with the evaporator; and controlling the amount of biomass fuel supplied to the biomass furnace in accordance with energy requirements of a customer load.

Preferably, the step of controlling the amount of biomass fuel supplied to the biomass furnace further includes the step of controlling the amount of biomass fuel supplied to the biomass furnace also in accordance with a control signal from a buffer load connected to the output of the generator. Also preferably, the step of controlling the amount of biomass fuel supplied to the biomass furnace additionally includes the step of controlling the amount of biomass fuel supplied to the biomass furnace also in accordance with a monitored evaporator temperature.

Three optional installations are brought up here. The first two are based of "biomass only," while the third one includes the option of supplementary energy by PV solar cells. The schemes shown in the examples are basic and additional features can be added which are not the issues of the present proposal such as use of heat recovery by recuperators after the condenser, etc.

CCVT unit is based on an organic Rankine cycle and comprises an evaporator, turbine, condenser and circulation pump.

Heat is supplied to the evaporator that is filled with organic fluid. The organic liquid temperature and pressure rises and part of the liquid is evaporated and flows out at the top of the evaporator. A turbine that is installed on the vapor path will utilize the energy of the expanding vapors, thus operating a generator for the generation of electric power.

A droplet separator is preferably installed at the vapors exit path to collect any liquid droplets that may enter the high pressure flow path, reach the turbine and damage the blades.

The expanding vapors, after expanding through the turbine, are condensed in a water or air-cooled condenser in which the pressure is lower according to the condensation temperature.

The condensed liquid is collected below the condenser and is pumped back to the evaporator to repeat the cycle. The liquid may be pumped by a mechanical driving force, turbine shaft-bearing centrifugal forces or gravity.

It is common practice to keep the cycle that uses organic fluid closed, for fear of losing material and air pollution because of the nature of such liquids.

BRIEF DESCRIPTION OF THE DRAWINGS

Embodiments of the present inventive subject matter are described by way of example and with reference to the accompanying drawings wherein.

DETAILED DESCRIPTION OF THE EMBODIMENTS

Figure 1:
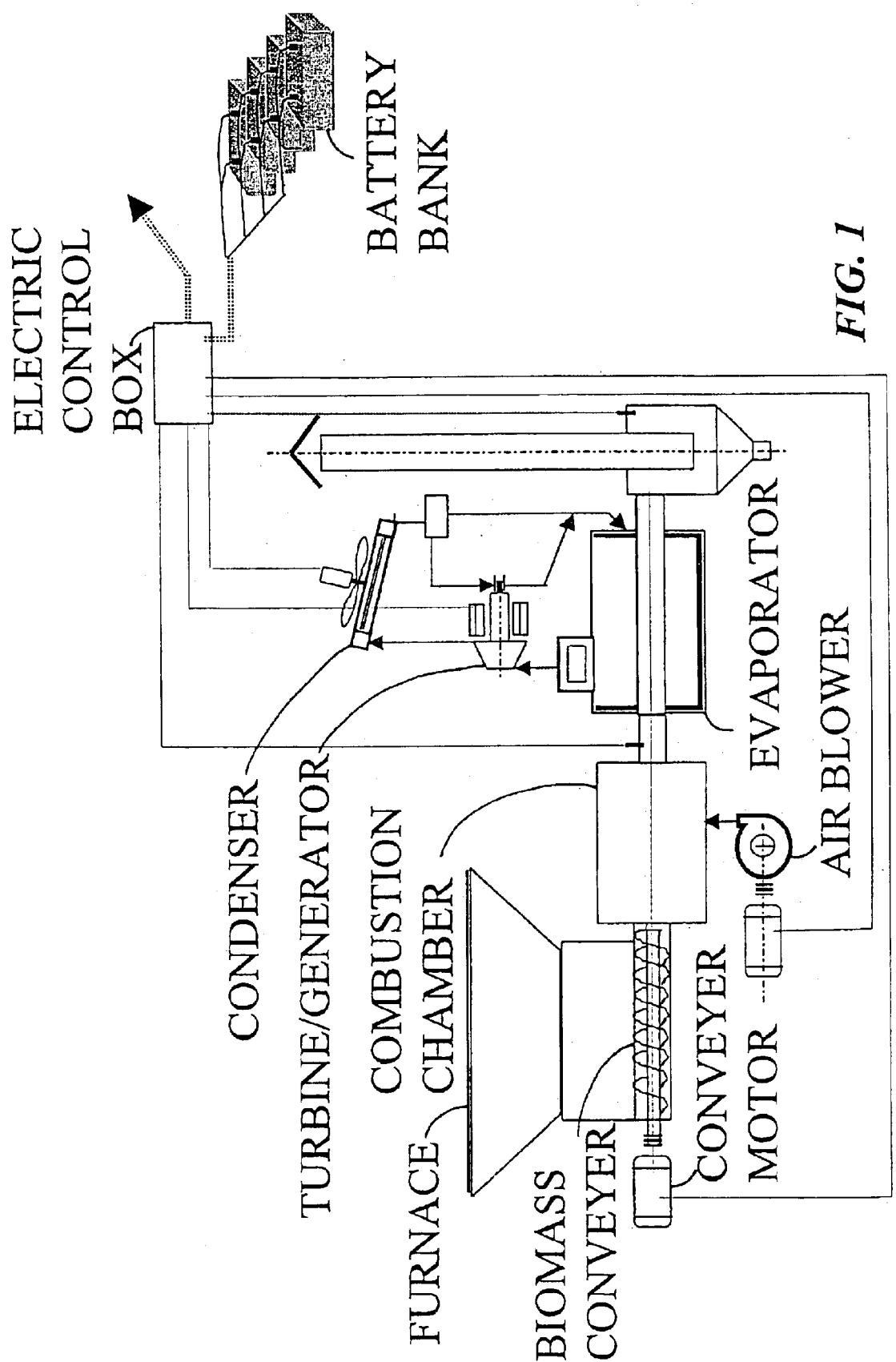
FIG. 1 is a schematic diagram of one embodiment of the apparatus of the present inventive subject matter.
Figure 2:
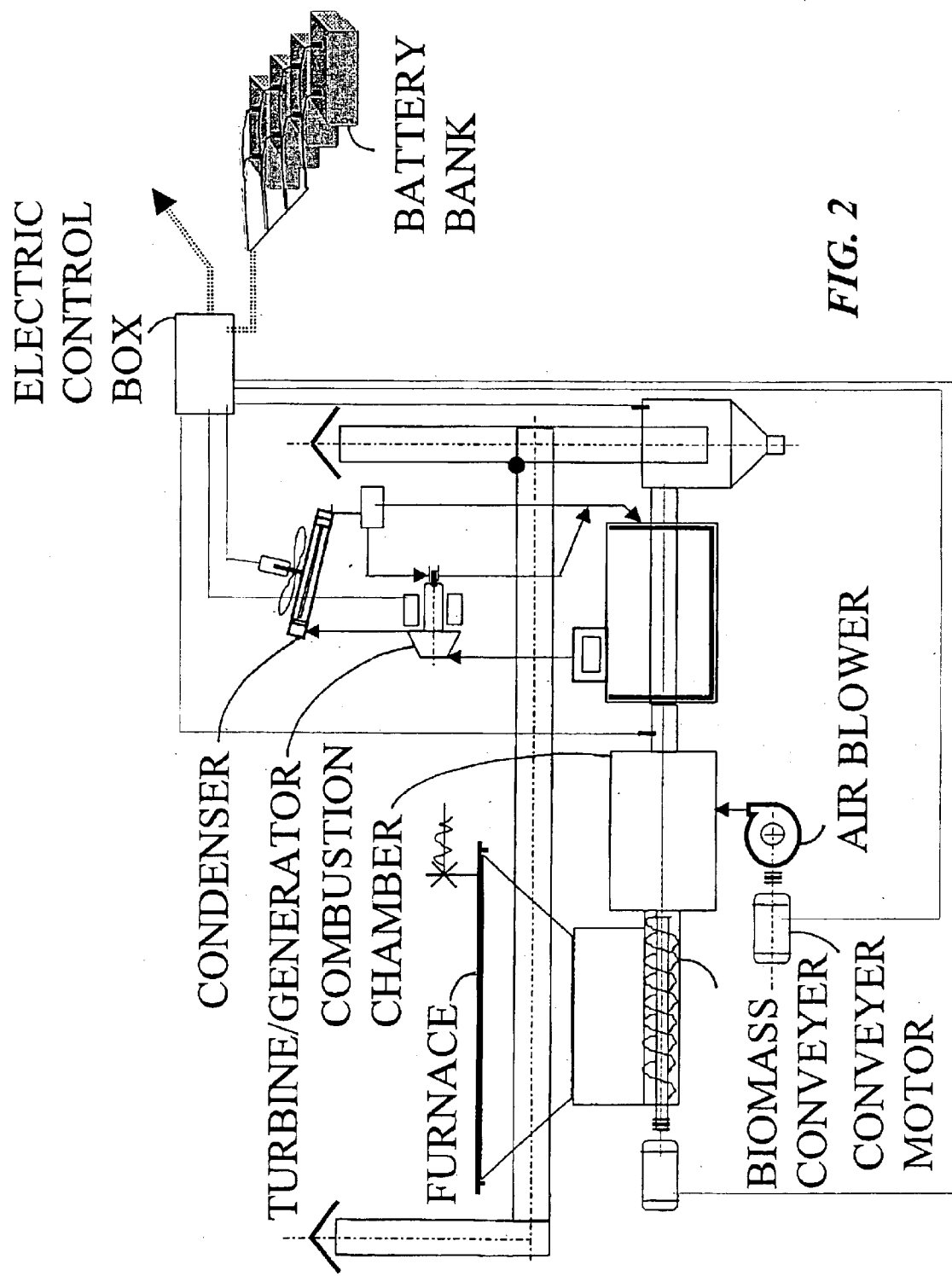
FIG. 2 is a schematic diagram of another embodiment of the present inventive subject matter.
Figure 3:
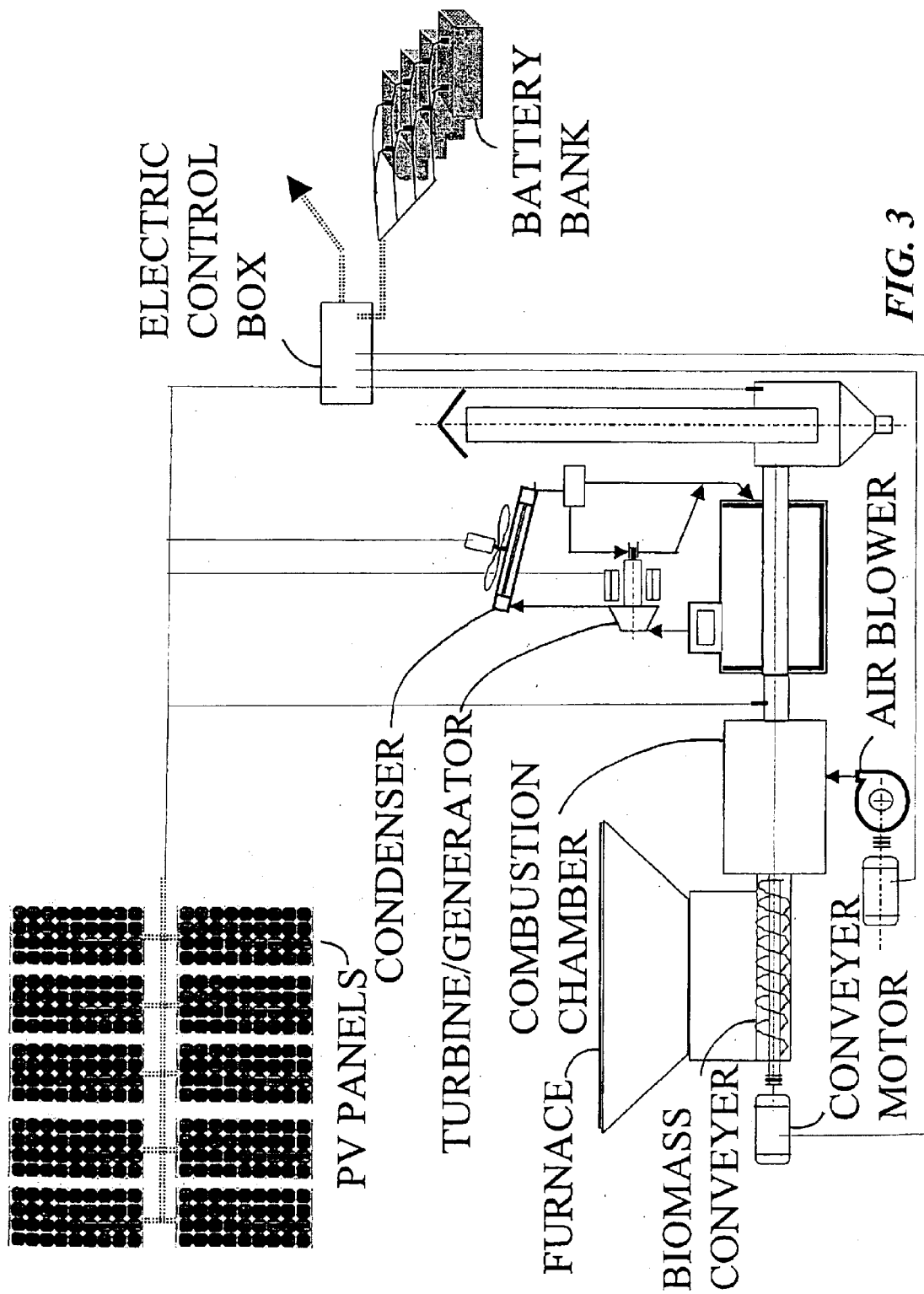
FIG. 3 is a schematic diagram of still another embodiment of the present inventive subject matter.

FIGS. 1 and 2 present a biomass furnace the is directly heating the organic liquid. The difference between the two cases is that in one case, the flue gas heat is wasted to the atmosphere, while in the second case, shown in FIG. 2, the flue gas is optionally turned back to the biomass feeding silo to dry the biomass, thus increasing the furnace combustion efficiency. Biomass may have a high moisture content that reduces the heat value of the fuel if it is not dried before combustion.

The following points should be pointed out. Biomass is fed automatically to supply energy requested by customer load. In the present invention, the operation of the system is controlled by a controller receiving a control signal from a buffer load. Preferably, the buffer load comprises a Pulse Width Modulator, the buffer load being connected to the power outlet of the turbine generator before the connection to the customer loads. When the buffer load is empty, due to customers's use for example, the furnace receives a signal to increase the biomass flow and when the buffer load is full, the furnace receives a signal to decrease the biomass flow. In case of temperature related control, the controller monitors the evaporator temperature and controls the fuel supply accordingly. The rate of fuel is controlled by the temperature difference between boiler instantly monitored temperature and desired temperature. Air supply is controlled and optimized by an oxygen sensor in the furnace exit or preferably in the boiler exit, i.e., the chimney side.

Photovoltaic (PV) solar energy is continuously connected during the day or if the biomass silo storage tank does not have enough stored biomass. Integration of PV solar energy is an option. Solar PV panels are connected to the already existing power bus, for example between the batteries bank and the inverter (see diagram of FIG. 4).

A single controller can control all operation modes. Small battery storage is necessary for the start; large battery storage is optional.

In case flue gas is used for drying the biomass fuel, the cover of the supply silo that is usually tightly sealed must be equipped with a safety valve to let off extra pressure created by the produced steam in the silo container—such drying will not only supply improved fuel to the combustion chamber, but also creates higher pressure in the feeding compartment, thus reducing the chances for return fire from the furnace to the fuel silo.

In case the unit is vertical and high-condensed organic liquid returns to the evaporator by gravity, part goes directly and the other part goes through the turbine bearing to lubricate it. In the case of a low unit-horizontal design unit, the turbine shaft rotation in the bearing produces pressure that pushes the lubricating liquid (the organic fluid) through designed peripheral holes in the housing to a downstream tank that can be the evaporator.

Ash particles contained in the flue gas are separated at the boiler exit to gain the thermal energy contained in it.

Figure 4:
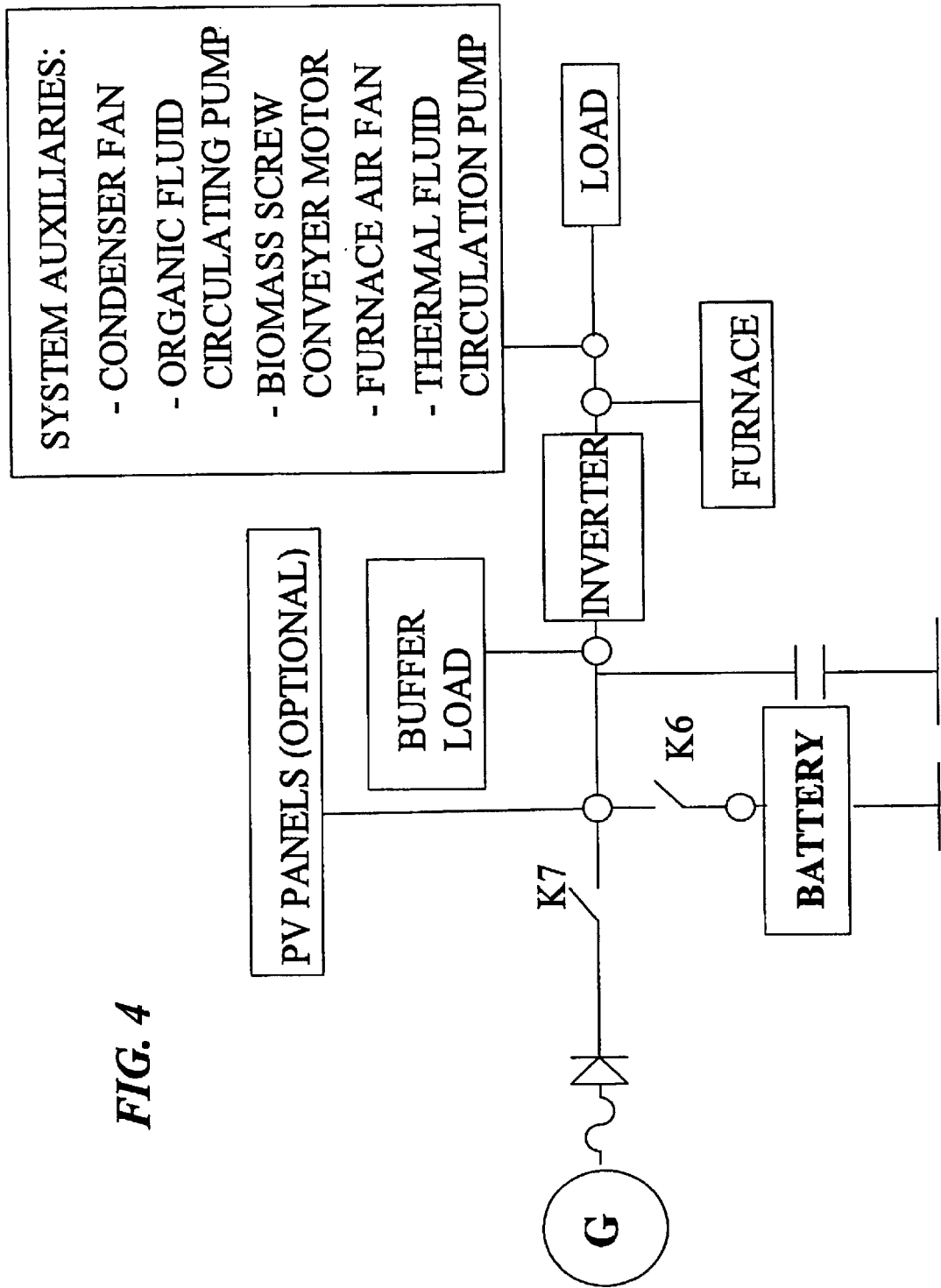
FIG. 4 is a block diagram of a yet further embodiment of the present inventive subject matter.

Referring now to FIG. 4 describing the operation of the biomass-fueled power unit, The systems are capable of supplying the required power output from zero to the maximum rated power output. In order to do this, the system identifies the desired power output and controls the furnace to supply the required thermal energy to produce this power output, by doing so the system uses only the biomass quantities required and saves large amounts of biomass.

This is accomplished with the help of a buffer load, preferably using a Pulse Width Modulator (PWM) which is connected to the power outlet of the turbine generator before the connection to the customer loads. When the buffer is empty, due to customer's use, for example, the furnace receives a signal to increase the biomass flow, and when the buffer is full, the furnace receives a signal to decrease the biomass flow.

The furnace is able to operate at thermal loads of 20% of the maximum load with desired ratio between the biomass flow and the air supply for efficient combustion. Air supply is controlled and optimized by an oxygen sensor in the furnace exit or preferably in the boiler exit side, i.e., chimney side.

The controller establishes the desired furnace output and sends furnace output and sends a linear signal to the furnace and to the air blower. The air supply to the combustion influences the oxygen level in the exhaust gases, the feeder supplies the required biomass to enable combustion with the desired air/fuel ratio. The air/fuel ration set point changes according to the power demand from the boiler, to optimize the furnace performance.

The operation of the system starts with power supply to the furnace and to the control system from a battery, when the turbine is turning, the generator charges the battery and disconnects the battery from the system. From here on, the furnace receives the power it requires from the turbine generator. In case of planned use of battery storage, the rate of produced power that will be used for charging from the total production can be controlled by the controller.

The system recognizes customer's request according to the buffer load condition, when the buffer load is full, the system will connect the customers and decrease the request from the furnace. When the buffer load is empty, the furnace receives a signal to work at full load and the customers are connected automatically only when the buffer load is full.

The inventive subject matter being thus described, it will be obvious that the same may be varied in many ways. Such variations are not to be regarded as a departure from the spirit and scope of the inventive subject matter, and all such modifications are intended to be included within the scope of the following claims.

What is claimed is:

1. A system for producing power at remote locations comprising:
   (a) a closed cycle vapor turbine unit in said remote locations having an evaporator containing liquid working fluid, a turbine receiving vapor of the evaporated working fluid for producing power by way of an electrical generator coupled to said turbine, a condenser and means for returning the working fluid condensate from the condenser to the evaporator;
   (b) a biomass furnace in said remote locations associated with said evaporator for heating working fluid present in the evaporator and evaporating a portion of said working fluid; and
   (c) a controller for controlling the amount of biomass fuel supplied to said biomass furnace in accordance with energy requirements of a customer load.

2. A system for producing power according to claim 1 wherein said controller for controlling the amount of fuel supplied to said biomass furnace further controls the amount of biomass fuel supplied to said biomass furnace also in accordance with a control signal from a buffer load connected to the output of said generator.

3. A system for producing power according to claim 2 wherein said controller for controlling the amount of biomass fuel supplied to said biomass furnace additionally controls the amount of biomass fuel supplied to the biomass furnace also in accordance with a monitored evaporator temperature.

4. A system for producing power according to claim 2 wherein said buffer load comprises a pulse width modulator.

5. A system for producing power according to claim 1 including an oxygen sensor located at the exit of said evaporator for controlling the air/fuel ratio in the biomass furnace.

6. A system for producing power according to claim 1 wherein said working fluid is an organic fluid.

7. A system for producing power according to claim 1 wherein said means for returning the working fluid from the condenser to the evaporator comprises a pump.

8. A system for producing power according to claim 1 further comprising a line for supplying flue gases exiting said evaporator biomass fuel for drying said biomass fuel.

9. A system for producing power according to claim 1 further comprising solar photovoltaic panels for producing electric power.

10. A method for producing power in remote locations comprising the steps of:
   (a) providing a closed cycle vapor turbine unit in said remote locations having an evaporator containing liquid working fluid, a turbine receiving vapor of the evaporated working fluid for producing power by way of an electrical generator coupled to said turbine, a condenser and means for returning the working fluid condensate from the condenser to the evaporator;
   (b) heating said working fluid present in the evaporator and evaporating portion of said working fluid using a biomass furnace in said remote locations associated with said evaporator; and
   (c) controlling the amount of biomass fuel supplied to said biomass furnace in accordance with energy requirements of a customer load.

11. A method according to claim 10 wherein the step of controlling the amount of biomass fuel supplied to said biomass furnace further includes the step of controlling the amount of biomass fuel supplied to said biomass furnace also in accordance with a control signal from a buffer load connected to the output of said generator.

12. A method according to claim 11 wherein the step of controlling the amount of biomass fuel supplied to said biomass furnace additionally includes the step of controlling the amount of biomass fuel supplied to said biomass furnace also in accordance with a monitored evaporator temperature.

13. A method according to claim 11 wherein the step of controlling the amount of biomass fuel supplied to said biomass furnace also in accordance with a control signal from a buffer load connected to the output of said generator is carried out using a pulse width modulator.

14. A method according to claim 10 including the step of controlling the air/fuel ration in the biomass furnace using an oxygen sensor located at the exit of said evaporator.

15. A method according to claim 10 including the step of using an organic fluid for the working fluid.

16. A method according to claim 10 wherein flue gases exiting said evaporator are used to dry the biomass fuel.

17. A method according to claim 10 further including the step of producing electric power using solar photovoltaic panels.

* * * * *

UNITED STATES PATENT AND TRADEMARK OFFICE
CERTIFICATE OF CORRECTION

PATENT NO. : 6,973,789 B2
DATED : December 13, 2005
INVENTOR(S) : Sugarmen et al.

It is certified that error appears in the above-identified patent and that said Letters Patent is hereby corrected as shown below:

Title page,
Item [56], References Cited, OTHER PUBLICATIONS, add:
-- van Loo et al., Handbook of Biomass Combustion and Co-Firing, Twente University Press, Enechede, The Netherlands, pp. 158-166, 330-331 (2001). --.

Signed and Sealed this

Seventh Day of February, 2006

JON W. DUDAS
*Director of the United States Patent and Trademark Office*